(12) United States Patent
Bao et al.

(10) Patent No.: US 8,588,785 B2
(45) Date of Patent: Nov. 19, 2013

(54) MEASUREMENT METHOD, A RELAY STATION, AND A BASE STATION IN A CELL HANDOVER PROCEDURE

(75) Inventors: Wei Bao, Beijing (CN); Zhuo Gao, Beijing (CN); Haizhou Bi, Beijing (CN)

(73) Assignee: China Academy Of Telecommunications Technology, Beijing (CN)

( * ) Notice: Subject to any disclaimer, the term of this patent is extended or adjusted under 35 U.S.C. 154(b) by 624 days.

(21) Appl. No.: 12/745,363

(22) PCT Filed: Nov. 12, 2008

(86) PCT No.: PCT/CN2008/001870
§ 371 (c)(1),
(2), (4) Date: May 28, 2010

(87) PCT Pub. No.: WO2009/070972
PCT Pub. Date: Jun. 11, 2009

(65) Prior Publication Data
US 2010/0311322 A1 Dec. 9, 2010

(30) Foreign Application Priority Data

Nov. 29, 2007 (CN) .......................... 2007 1 0178387

(51) Int. Cl.
*H04W 36/08* (2009.01)
*H04W 36/24* (2009.01)
*H04W 36/38* (2009.01)
(52) U.S. Cl.
USPC .................. 455/438; 455/561; 455/7; 455/9; 455/15
(58) Field of Classification Search
None
See application file for complete search history.

(56) References Cited

U.S. PATENT DOCUMENTS

| 7,907,540 | B2 * | 3/2011 | Li et al. ..................... 455/9 X |
| 2004/0224631 | A1 | 11/2004 | Davis et al. |
| 2007/0060050 | A1 | 3/2007 | Lee et al. |
| 2008/0108355 | A1 * | 5/2008 | Oleszcsuk .................. 455/442 |
| 2008/0108369 | A1 * | 5/2008 | Visotsky et al. ............ 455/455 |
| 2009/0088164 | A1 | 4/2009 | Shen et al. |

FOREIGN PATENT DOCUMENTS

| CN | 1226768 | 8/1999 |
| CN | 1996786 | 7/2007 |
| CN | 101009926 | 8/2007 |
| EP | 1 775 948 | 4/2007 |

(Continued)

OTHER PUBLICATIONS

International Search Report for International Application No. PCT/CN2008/001870 dated Jan. 22, 2009, 3 pages.

(Continued)

*Primary Examiner* — Philip Sobutka
(74) *Attorney, Agent, or Firm* — Nixon Peabody LLP (57) ABSTRACT

The present invention provides a measurement method in a cell handover procedure, comprising: A. after network measurement is triggered, a base station schedules resources, which are needed for transmitting uplink data, for a user terminal; and B. the base station and relay stations measure relevant data transmitted from the user terminal on the resources scheduled by the base station, and the relay stations report the detection information of the uplink signal derived from the measurement to the base station. A relay station and a base station for realizing cell handover are also provided. The present invention can realize that during measuring the quality of the signal from a user terminal and a network side, the network performs the measurement, and selects a target node to which the user terminal will handover according to the result of the measurement.

14 Claims, 5 Drawing Sheets

(56) References Cited

FOREIGN PATENT DOCUMENTS

| | | |
|---|---|---|
| JP | 2005341300 | 12/2005 |
| KR | 20070075748 | 7/2007 |
| WO | 2007/078138 | 7/2007 |

OTHER PUBLICATIONS

Written Opinion for International Application No. PCT/CN2008/001870 dated Jan. 22, 2009, 3 pages.

* cited by examiner

MEASUREMENT METHOD, A RELAY STATION, AND A BASE STATION IN A CELL HANDOVER PROCEDURE

TECHNICAL FIELD

The present invention relates to a cell handover technology in a mobile communication system, and more particularly to a measurement method (measure method) in a cell handover procedure, a relay station and a base station.

BACKGROUND OF THE INVENTION

To meet the demands of user terminals on the full coverage and the high capacity of a system, many Relay Stations (RS) may be used in future mobile communication systems. Relevant definitions of the RSs are provided as follows:

A relay station is a node having the function of forwarding the data from a user terminal or a control signaling between node and node. Wherein, between node and node includes: between a BS (Base station) and an RS, between a RS and a RS, and between a RS and a User Terminal (UT).

A transparent RS: it does not transmit downlink synchronous channel message, system configuration message and resource distribution broadcast message.

A non-transparent RS: the non-transparent RS transmits its own downlink synchronous channel message, and the system configuration message and resource allocation broadcast message.

An access link is a radio link starting or terminating at a UT.

A relay link is a radio link between a BS and a RS or a radio link between a RS and a RS.

Compared with the BS, the RS has advantages of flexible arrangement and low cost, thus the cost of building a network can be reduced. The introduction of the RS can expand the system capacity, enlarge the coverage area of a cell, and enhance the transmission data rate.

Figure 1:
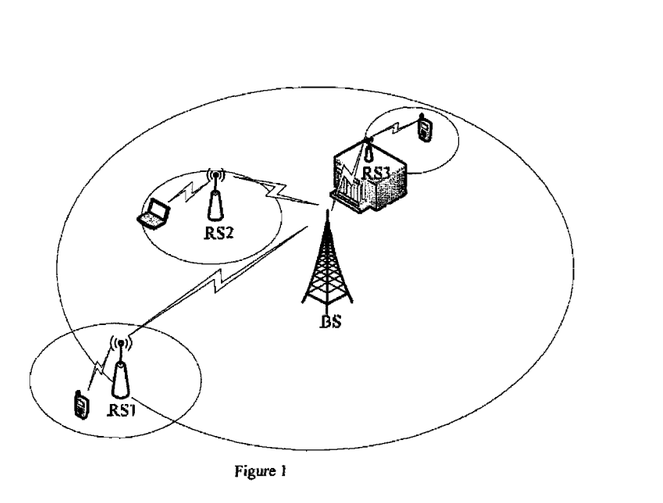
FIG. 1 is a schematic view of the different application scenes and the functions of the RS.

FIG. 1 is a schematic view of different application scenes and effects of RSs. In the actual use, the coverage area of a transparent RS completely falls within the coverage area of a BS, while the coverage area of a non-transparent RS may partly or completely beyond the coverage area of a BS. As shown in FIG. 1, the RS2 for providing hotspot coverage is a transparent RS, while the relay station RS1 for enlarging the coverage area of the BS and the RS3 for solving the shadow effect are non-transparent RSs.

Figure 2:
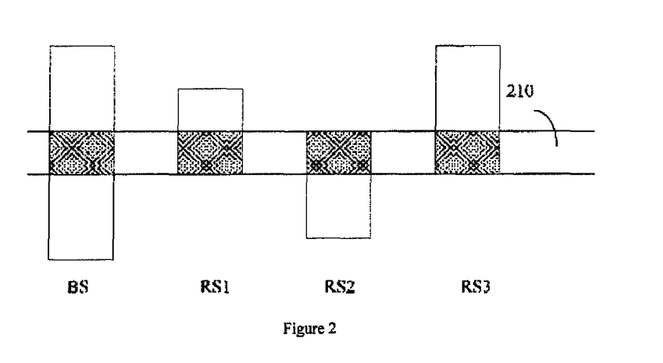
FIG. 2 is a schematic view of the relationship between the operating frequency bands of the BS and its dominated relay stations.

To avoid mutual interference of radio signals between RSs, during actual network deployment, usually the operating frequency bands of adjacent RSs are differentiated, as the operating frequency bands of the nodes shown in FIG. 2. As shown in FIG. 2, RS1, RS2 and RS3 are the RSs dominated by the BS. The BS can use all the frequency bands in the cell, and respective RSs can use part or all of the frequency bands in the cell. The size of the frequency band used by the RS depends on the traffic volume of the user terminal served by the RS and the designing ability of the RS. RS1, RS2 and RS3 have a same frequency band 210 with the BS, the corresponding frequency bands of the BS and the respective RSs are shown with the lattice filling portion, and the same frequency band is called the common frequency band, the main functions of which include providing mutual communication between RSs; and receiving common information transmitted from the UT, such as preamble etc.

The handover procedure of serving nodes performed by UT is explained as follows: the handover refers to a procedure in which the user terminal must handover from the current communication link to an idle communication link managed by other access nodes when a user terminal moves from the coverage area of one BS or RS to that of another BS or RS during communication, or the quality of communication is degraded due to external interferences, wherein the access node is a BS or a RS.

The handover procedure of mobile communication systems can be divided into three main procedures: the measurement procedure, the judgment procedure and the execution procedure respectively, wherein, The measurement procedure: its main function is to measure parameters needed by handover in a radio communication system and verify the result of a measurement report. The measurement procedure is mainly divided into an intra-system measurement and an inter-system measurement, and an intra-frequency measurement and an inter-frequency measurement. The measurement procedure mainly relates to parameters such as the period and the format of the measurement report. In the current wireless communication system, the measurement mainly refers to that of the UT who detects the downlink pilot signal transmitted from the BS, and judges the quality of the downlink pilot signal. In a future mobile communication system, some serving nodes on network side, such as the transparent RS, do not have a downlink pilot signal for measurement, and in this situation, the quality of the signal between the UT and the network cannot be measured.

The judgment procedure: its main function is to give a judgment result according to the demands of parameters about network and service and by referring to the corresponding thresholds and the measurement result, and finally determine whether the UT handovers and the target cell of handover. The design of the judgment procedure specifically embodies various handover rules in a handover algorithm and also specifically reflects the system performance.

The execution procedure: its main function is to enable the UT to establish a connection with the target cell by interacting signaling between the target cell and the UT when the judgment procedure judges that corresponding handover of the UT is needed, and to assign corresponding resources to the user, thereby completing the entire handover procedure.

According to the above description, in the prior art, when some serving nodes on network side, such as the transparent RS, do not have the downlink pilot signal for measurement, the user terminal cannot measure the quality of the signal between the UT and the network, thus is unable to perform cell handover.

SUMMARY OF THE INVENTION

In view of the said description, the present invention mainly aims to provide a measurement method in a cell handover procedure, and this method measures the quality of signals at network side during the cell handover procedure.

Another object of the present invention is to provide a relay station and a base station for realizing cell handover. During the cell handover performed by a user terminal, the relay station and the base station can be used for measuring the quality of the signal between themselves and a user terminal. To achieve the above objects, the technical solution of the present invention is realized in the following way:

The present invention provides a measurement method in a cell handover procedure, comprising:

A. after network measurement is triggered, a base station scheduling resources, which are needed for transmitting uplink data, for a user terminal; and B. the base station and a relay station measuring relevant data transmitted from the user terminal on the resources scheduled by the base station, and the relay station reporting the measured detection information of the uplink signal to the base station.

Wherein, after the network measurement is triggered, when the said base station detects that the user terminal has uplink data, the resources scheduled by the base station are common frequency band resources, and the relevant data is the uplink data transmitted from the user terminal.

When the base station has scheduled the common frequency band resources for the user terminal, what is between step A and step B further comprising:

A1. The said base station transmitting resource scheduling information obtained by scheduling the resources to corresponding relay stations and the user terminal, wherein the corresponding relay stations comprise the original serving node of the user terminal and adjacent relay stations, and the corresponding relay stations are transparent or non-transparent relay stations.

Step A further comprising:
the said base station assigning a dedicated random access preamble and access resources to the said user terminal, and transmitting the above resource scheduling information to the said user terminal.

After the network measurement is triggered, when the said base station has detected that the user terminal does not have uplink data, the resources scheduled by the said base station are a dedicated preamble and access resources, and correspondingly, the relevant data is the dedicated preamble transmitted from the user terminal, and step A further comprising that the base station transmitting the resource scheduling information obtained by scheduling to the user terminal.

What is between step A and step B further comprising:
A2. the said base station transmitting resource scheduling information by scheduling the resources to corresponding relay stations which comprise the original serving node of the user terminal and adjacent relay stations, and wherein the corresponding relay stations are transparent or non-transparent relay stations.

Subsequence to step B, comprising:
C. the said base station determining a target node to which the user terminal will handover according to the measurement result measured by itself and/or the detection information of the uplink signal.

Subsequence to step C, comprising:
D. when the target node is the original serving node of the user terminal, the handover procedure finishing; when the target node is different from the original serving node of the user terminal, the base station notifying the original serving node to release connection, and the original serving node reporting the receiving and transmitting state information of the uplink and downlink data of the user terminal.

Subsequence to step D, comprising:
E. when the said target node is the base station per se, the base station configuring itself according to the received state information and transmitting an adjustment signaling to the user terminal, the user terminal adjusting relevant parameters according to the adjustment information in the adjustment signaling, and then the handover procedure finishing.

Step E further comprising:
when the said target node is a relay station, the base station generating a state configuration signaling according to the received state information and target node information and transmitting it to the target node to configure the target node, and generating an adjustment signaling and transmitting it to the user terminal, and the user terminal adjusting relevant parameters according to the adjustment information in the adjustment signaling, and then the handover procedure finishing.

The present invention also provides a relay station for realizing cell handover, and the relay station comprises: a data receiving module, an uplink data detecting module and a data transmitting module, wherein, the data receiving module being used for transmitting resource scheduling information to the uplink data detecting module after receiving the same transmitted from a base station;

the uplink data detecting module being used for detecting relevant data of a user terminal on corresponding frequency bands after receiving the resource scheduling information, and transmitting the obtained detection information of the uplink signal to the data transmitting module; and the data transmitting module being used for transmitting the detection information to the base station after receiving the detection information of the uplink signal.

Wherein, the said relay station is a transparent or a non-transparent relay station.

Wherein, the relevant data is the uplink data transmitted from the user terminal or a dedicated preamble.

The data receiving module being further used for transmitting a signal to a state information generating module after receiving a releasing connection signaling transmitted from the base station;

correspondingly, the said relay station further comprising:
the state information generating module being used for releasing the connection with the user terminal after receiving the said signal transmitted from the data receiving module, and generating receiving and transmitting state information and transmitting it to the data transmitting module;

correspondingly, the data transmitting module being further used for transmitting the receiving and transmitting state information received to the base station.

The data receiving module being further used for transmitting a state configuration signaling to a state configuring module after receiving the state configuration signaling transmitted from the base station;

correspondingly, the relay station further comprising:
the state configuring module being used for, after receiving the configuration signaling, configuring the relay station, which the state configuring module belongs to, as the serving node of the user terminal according to the receiving and transmitting state information of the uplink and downlink data of the user terminal in the configuration signaling.

The present invention also provides a base station for realizing cell handover, comprising a data receiving module, a resource scheduling module, an uplink data detecting module, a serving node selecting module and a data transmitting module, wherein, the data receiving module being used for transmitting the received detection information of the uplink signal transmitted from a dominated relay station to the serving node selecting module;

the resource scheduling module being used for judging whether the user terminal has uplink data when the network measurement is triggered, and correspondingly scheduling common frequency band resources for the user terminal or assigning a dedicated preamble and access resources to the user terminal, and transmitting the above resource scheduling information to the uplink data detecting module and the data transmitting module;

the uplink data detecting module being used for detecting the relevant data transmitted from the user terminal on the corresponding frequency band after receiving the resource scheduling information, and transmitting the result of the detection to the serving node selecting module;

the serving node selecting module being used for determining a target node serving the user terminal according to the received result of the detection and the detection information of the uplink signal, and transmitting the information of the target node; and the data transmitting module being used for transmitting the received resource scheduling information to the user terminal and corresponding relay stations.

Wherein, the data receiving module being further used for transmitting the receiving and transmitting state information received from the original serving node of the user terminal to a configuration signaling generating module.

The serving node selecting module being further used for generating a releasing connection signaling and transmitting it to the data transmitting module when the determined target node is different from the original serving node of the user terminal; and being further used for transmitting the information of the target node to an adjustment signaling generating module and a state configuring module.

Correspondingly, the base station further comprising:

the state configuring module being used for, after receiving the receiving and transmitting state information, according to the received information of the target node, configuring the base station as the serving node of the user terminal when the target node is the base station per se; and generating a state configuration signaling and transmitting it to the data transmitting module when the target node is a relay station; and the adjustment signaling generating module being used for generating an adjustment signaling according to the information of the target node and the result of detecting the uplink data from the user terminal by the target node, and transmitting the adjustment signaling to the data transmitting module; and correspondingly, the data transmitting module being further used for transmitting the received state configuration signaling to the target node; and being further used for transmitting the received adjustment signaling to the user terminal.

The said relevant data is the uplink data transmitted from the user terminal or a dedicated preamble.

The measurement method in a cell handover procedure, and the relay station and the base station for realizing cell handover provided by the present invention have the following advantages and features.

(1) when a UT needs to perform cell handover, the measurement to the downlink pilot signal will not be made by the user terminal, and the network side triggers the measurement mechanism to measure the quality of the uplink signal between the UT and the network side, and finally selects the target node to which the UT will handover according to the measurement result.

(2) After the measurement on the network side is triggered, the BS schedules the common frequency band resource for the UT to transmit the uplink data, and when the common frequency band resource cannot be scheduled, the BS assigns a dedicated random access preamble sequence (hereinafter referred to as Preamble) and access resources to the UT for measuring the uplink data from the UT, thus avoiding the situation where the most suitable serving node is unable to measure the uplink data from the UT if different frequency bands are not used for adjacent RSs.

Figure 3:
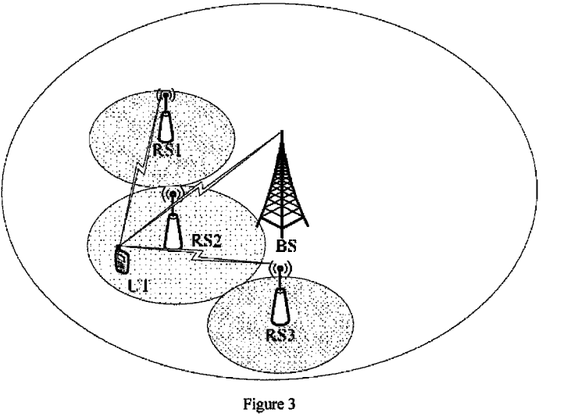
FIG. 3 is a schematic view illustrating the situation in which the best serving cell cannot be selected by the base station as a target node.

For example, as shown in FIG. 3, the frequency band used for transmitting the uplink data by the user terminal UT is within the receiving frequency bands of the transparent or non-transparent relay station RS1, RS3 and the base station, but out of the receiving frequency band of the transparent or non-transparent relay station RS2. The current serving node of the user terminal UT is RS1. With the movement of the UT, the RS1 is no longer suitable as a serving node, and by this time, the BS starts network measurement, configures RS1, RS3 and the BS and measures the uplink signal of the UT at the same time, and selects a serving node for the UT according to the measurement result. Seen from FIG. 3, the UT is closest to RS2 now, but as the frequency band used for the UT to transmit the uplink data is out of the operating frequency band of RS2, it will disable RS2 to measure the uplink signal of the UT, and finally make RS2 fail to be selected by the BS as the serving node of the UT.

In the present invention, the BS schedules the common frequency band resources for the UT, and tries to enable the RSs around the UT to measure the uplink data of the UT; and in case there are no common frequency band resources, the BS assigns the dedicated preamble and the access resources to the UT, so that the RS can measure the corresponding preamble, thereby fundamentally avoiding the above problems that may appear.

(3) In the present invention, when the UT has no uplink data to transmit, the BS assigns to the UT the dedicated preamble and the access resources, the RS and the BS measure the quality of the signals by measuring the preamble transmitted from the UT, thereby avoiding the problem that network measurement cannot be made if the UT has no uplink data to transmit.

DETAILED DESCRIPTION OF THE INVENTION

The basic idea of the present invention is described as follows: after a measurement mechanism is triggered, a base station assigns common frequency band resources, or a dedicated preamble and access resources to a user terminal; when the user terminal transmits relevant data on the said resources, the base station and the corresponding relay station measure the uplink data transmitted from the user terminal; the base station determines a target node to which the user terminal will handover according to the measurement results of itself and the relay station, and performs the subsequent cell handover procedures.

Detailed description will be made hereinafter through the embodiment in conjunction with the accompanying drawings.

Figure 4:
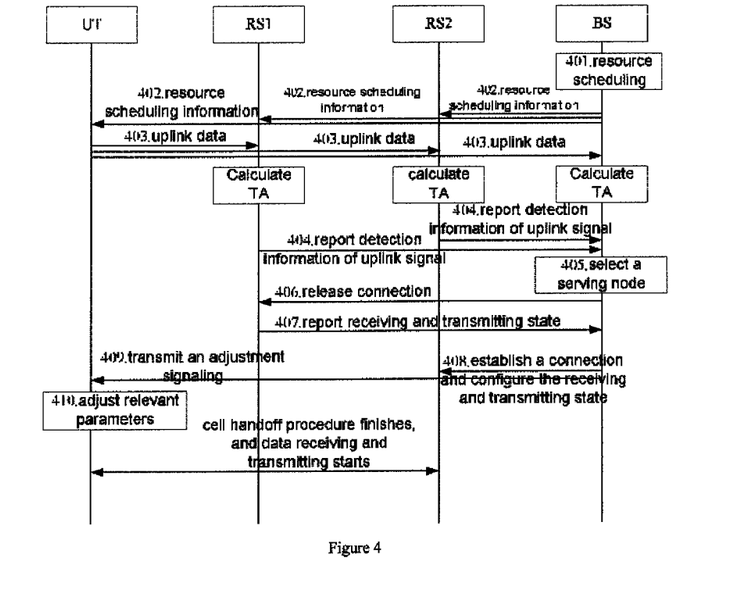
FIG. 4 is a schematic view of the flow of the handover method when the base station schedules the common frequency band resources for the user terminal according to the present invention.

FIG. 4 is a schematic view of the flow of the handover method when the base station schedules the common frequency band for the user terminal according to the present invention, wherein it comprises a UT, RS1, RS2 and a BS, and the relay station RS1 is the original serving node for the UT, the relay station RS2 is the target node selected by the BS for the UT, but the method is not only used for the UT, RS1, RS2 and the BS, but also for other RSs to detect the uplink data from the UT, and the steps before step 405 in the data interaction procedures between the other RSs and the BS and the UT are identical with that between the target node RS2 and the BS and the UT, which is not shown in FIG. 4. Wherein, the said relay stations are transparent or non-transparent relay stations. As shown in FIG. 4, the method comprises:

Step 401: after the network measurement is triggered at the BS side, the BS first judges whether the measured UT has uplink data, and if it has uplink data, the BS schedules resources for the UT to transmit the uplink data, and it is ideal that the said resources are common frequency band resources. In the handover procedure as shown in FIG. 4, the said resources are common frequency band resources. Wherein, when the UT does not have uplink data, the BS will assign a dedicated preamble and access resources to the UT, by the time, the specific process flow that the UT performs cell handover has been detailed in the handover method shown in FIG. 5, thus is omitted here.

Wherein, the conditions for triggering the network measurement at the BS side comprise, but not limited to, one or more of:

when the serving node is a RS, and when the wireless channel environment of a user deteriorates, the serving node reports that to the BS, and the network measurement may be triggered;

when the serving node is a BS, and when it finds out that the wireless channel environment of a user deteriorates, the network measurement may be triggered; and when the UT finds out that the wireless channel environment deteriorates, the network measurement may be triggered.

Wherein, the common frequency band may be the common operating frequency band of all the RSs, and can also be the common operating frequency band of part of the RSs. The more the RSs which can receive the frequency band, the higher the probability of good effect obtained by the finally selected serving node is. Also, the said common frequency band must be within the operating frequency band of the current serving node, and the said part of the RSs had better be the RSs around the UT.

As the operating frequency bands of various RSs dominated by the BS are determined values, when the UT uses the BS or one RS dominated by it as a serving node, the BS can determine the location of the UT and the RSs around the UT accordingly, thus obtain the common frequency bands of the RSs around the UT.

Wherein, how the BS specifically judges whether the UT has uplink data, how the BS specifically schedules the resources or common frequency band resources for the UT, and how to assign the dedicated preamble and the access resources to the UT are well known in the prior art, and thus are omitted herein. Likewise, the methods as to how the BS specifically determines the RSs that are around the UT and can provide services to the UT and the method to determine the common frequency band according to the operating frequency bands of respective RSs are also well known in the prior art, and thus are omitted herein.

Step 402: when the BS has scheduled the common frequency band resources, the BS notifies the UT and the corresponding RSs of the resource scheduling information obtained by resource scheduling. Wherein, the corresponding relay stations comprise the current original serving node of the user terminal and adjacent relay stations.

Wherein, when the frequency band scheduled in step 401 is the common frequency band of all the RSs, the BS can either notify all dominated RSs of the result of resource scheduling, or only notify the RSs around the UT of the same result; when the frequency band scheduled by the BS in step 401 is the common frequency band of part of the RSs, the above corresponding RSs are the corresponding RSs used for determining the common operating frequency band in step 401, or can be part thereof, or all the RSs dominated by the BS that can receive the frequency band.

Wherein, the said specific RSs that need to be notified can be controlled flexibly in actual applications.

Figure 5:
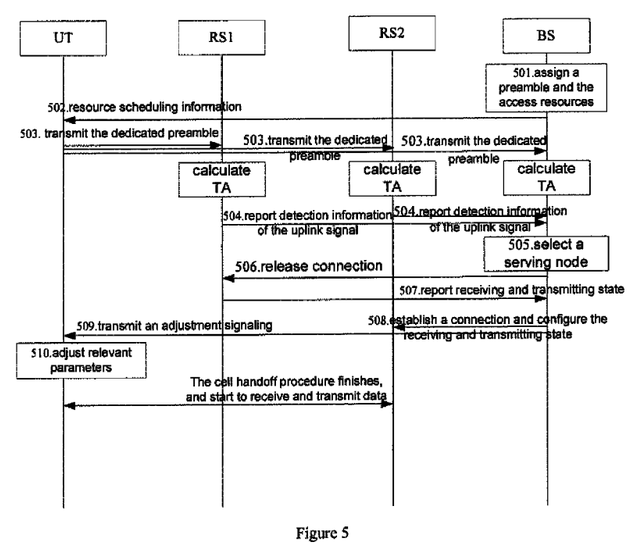
FIG. 5 is a schematic view of the flow of the handover method when the base station assigns a dedicated preamble to the user terminal according to the present invention.

Wherein, when the BS fails to schedule the common frequency band resources, the BS will assign the dedicated preamble and the access resources to the UT, and when the BS assign the dedicated preamble to the UT, the specific process method of the handover procedure is detailed in the handover method shown in FIG. 5, thus is omitted herein.

Step 403: the UT transmits uplink data on the resources notified by the BS in step 402, and the corresponding RS and the corresponding BS detect the said uplink data. In correspondence to the corresponding RSs notified by the base station, the current original serving node of the user terminal, adjacent relay stations and the BS detect the said uplink data, and the information that needs to be detected comprises, but not limited to, one or more of:

the deviation between the arrival time of an uplink signal and an expected arrival time, i.e., TA (Timing Alignment); and the power of the received signal.

Wherein, how the RSs and the BS perform TA to the uplink data and detect power and so on are well known in the prior art, thus are omitted herein.

Step 404: the RS reports the detection information of the uplink signal detected in step 403 to the BS.

Step 405: the BS selects a target node to which the UT will handover according to the information detected by itself and the said detection information of the uplink signal reported by the RS, and if the selected target node is the original serving node RS1 currently serving the UT, no handover is needed, and the handover procedure finishes, and the UT continues to receive from and transmit to the original serving node RS1; if the selected target node is not the original serving node RS1, step 406 will be performed. Suppose that the target node selected by the base station is RS2.

Wherein, how the BS specifically selects the serving node according to the detected information is well known in the prior art, and thus is omitted herein.

Step 406, the BS transmits the connection release signaling to the original serving node RS1, wherein the said connection release signaling is used for notifying the original serving node RS1 to release the connection with the UT.

Step 407: the original serving node RS1 returns to the BS the receiving and transmitting state information of the uplink and downlink data of the UT.

Step 408: the BS configures a target node, and if the target node is the BS, the BS only needs to locally configure the target node according to the receiving and transmitting state information received, and then step 409 will be performed; if the target node is one RS, which is the RS2 in this embodiment, the BS transmits the state configuration signaling to the target node RS2, and the said signaling is used for configuring the target node RS2. By way of the configuration, the BS configures the target node RS2 with the receiving and transmitting state of the original serving node RS1.

Step 409: the BS transmits the adjustment signaling to the UT, wherein the said signaling comprises information such as the TA and a transmission power, which is used for adjusting the TA and the transmission power by the UT.

Wherein, the TA and the transmission power, which are adjusted by the UT as notified above, are determined according to the detection information of the uplink signal reported by the relay station RS2 which is selected as the target node in step 404.

Step 410: the UT adjusts transmission parameters according to the adjustment information in the received said signaling received. Wherein, how the UT specifically adjusts the parameters according to the adjustment information such as the TA and the power is well known in the prior art, and thus is omitted herein.

Then the handover procedure finishes, and the UT starts to communicate with the target node RS2.

FIG. 5 is a schematic view of the flow of the handover method when the base station assigns a dedicated preamble to the user terminal according to the present invention, wherein it comprises a UT, a RS1, a RS2 and a BS, and the relay station RS1 is the original serving node of the UT, the relay station RS2 is the target node selected by the BS, but the method is not only used for the UT, RS1, RS2 and the BS, but also for other RSs which detect the uplink data from the UT, and the steps before step 505 in the processes for the other RSs are identical with that for the RS2, which is not shown in FIG. 5. As shown in FIG. 5, the method comprises:

Step 501: after the network measurement is triggered at the BS side, when the BS judges that the UT does not have uplink data, or the BS cannot schedule the common frequency band resources for the UT during resource scheduling, the BS assigns a preamble and access resources to the UT.

Wherein, the main reasons why the aforesaid BS cannot schedule the resources used by the UT to transmit the uplink data to the common frequency band for transmission are as follows: on the common frequency band, the quality of the uplink signal between the UT and the current serving node is poor, and if the UT is forced to transmit the uplink data on the frequency band, it will lead to the loss or delay of the user' data, and further affect users' experience; and no remaining resources of the common frequency band can be scheduled for the current UT.

Wherein, the aforesaid preamble assigned by the BS to the UT should be a dedicated preamble, i.e., on the above resources, only the UT can transmit the preamble, and if other UTs want to use the above resources to transmit the preamble, the preamble they use must be different from the above dedicated preamble.

Wherein, the conditions for triggering the network measurement at the BS side comprise, but not limited to, one or more of:
the serving node is a RS, when the wireless channel environment of a user deteriorates, the serving node reports that to the BS, and the network measurement may be triggered;
when the serving node is a BS, and when it finds out that the wireless channel environment of a user deteriorates, the network measurement may be triggered; and
when the UT finds out that the wireless channel environment deteriorates, the network measurement may be triggered.

Wherein, how the BS specifically judges whether the UT has uplink data, how the BS specifically schedules resources or common frequency band resources for the UT, and how to assign the dedicated preamble and the access resources to the UT are well known in the prior art, thus are omitted herein.

Step 502: the BS notifies the preamble and the access resources assigned for the UT to the UT and the corresponding RSs.

Wherein, the said corresponding relay stations comprise the original serving node of the user terminal and adjacent relay stations. If the RS has been configured to detect all the preambles on the access resources, the above-mentioned information does not need to be transmitted to respective RSs, and in this step, the BS just needs to notify the UT of the information.

Step 503: the UT transmits the dedicated preamble on the resources notified by the BS in step 502, and the RS and the BS detect the preamble, wherein the information needs to be detected comprises, but not limited to, one or more of: the deviation between the arrival time of the uplink signal and the expected arrival time, i.e., TA; and the power of the received signal. Wherein, the dedicated preamble and the uplink data need to be transmitted by the UT are collectively referred to as uplink data.

Step 504: the RS reports the detection information of the uplink signal detected in step 503 to the BS.

Step 505: the BS selects a target node to which the UT will handover according to the information detected by itself and the detection information reported by the RSs, and if the selected target node is the current serving node, no handover is needed, and the handover procedure finishes; if the selected target node is not the current serving node, step 506 will be performed. Suppose that the target node is RS2.

Wherein, how the BS specifically selects a serving node according to the information is well known in the prior art, and thus is omitted herein.

Steps 506-510 are identical with steps 406-410, and thus are omitted herein.

In the cell handover methods as shown in FIGS. 4 and 5, the uplink data transmitted from the user terminal in step 403 and the dedicated preamble transmitted from the user terminal in step 503 are collectively referred to as relevant data.

Figure 6:
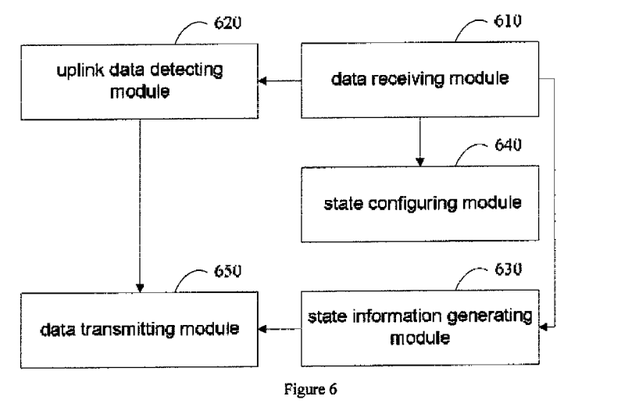
FIG. 6 is a schematic view of the structure of the relay stations for realizing cell handover according to the present invention.

FIG. 6 is a schematic view of the structure of the relay station for realizing cell handover. As shown in FIG. 6, the relay station comprises a data receiving module 610, an uplink data detecting module 620, a state information generating module 630, a state configuring module 640, and a data transmitting module 650, wherein,
the data receiving module 610 is used for transmitting resource scheduling information to the uplink data detecting module 620 after receiving the resource scheduling information transmitted from the BS; transmitting a signal to the state information generating module 630 after receiving a connection release signaling transmitted from the BS; and transmitting a state configuration signaling to the state configuring module 640 after receiving the state configuration signaling transmitted from the BS; and
the uplink data detecting module 620 is used for detecting the relevant data of the UT on the corresponding frequency band according to resource scheduling information after receiving the resource scheduling information from the data receiving module 610, and generating the detection information of the uplink signal from the detected information and transmitting it to the data transmitting module 650.

Wherein, the relevant data comprises the uplink data that the UT needs to transmit and the dedicated preamble assigned by the BS for the UT.

The state information generating module 630 is used for generating receiving and transmitting state information according to the receiving and transmitting state of the uplink and downlink data of the UT after receiving the signal transmitted from the data receiving module 610 and transmitting the receiving and transmitting state information to the data transmitting module 650.

The state configuring module 640 is used for, after receiving the state configuration signaling transmitted from the data receiving module 610, configuring the RS which the state configuring module 640 belongs to as a serving node of the UT according to the receiving and transmitting state information of the uplink and downlink data of the UT included in the signaling.

The data transmitting module 650 is used for transmitting the detection information of the uplink signal or the receiving and transmitting state information to the BS after receiving the information.

Obviously, the above-mentioned relay station can be either a transparent or a non-transparent relay station.

Figure 7:
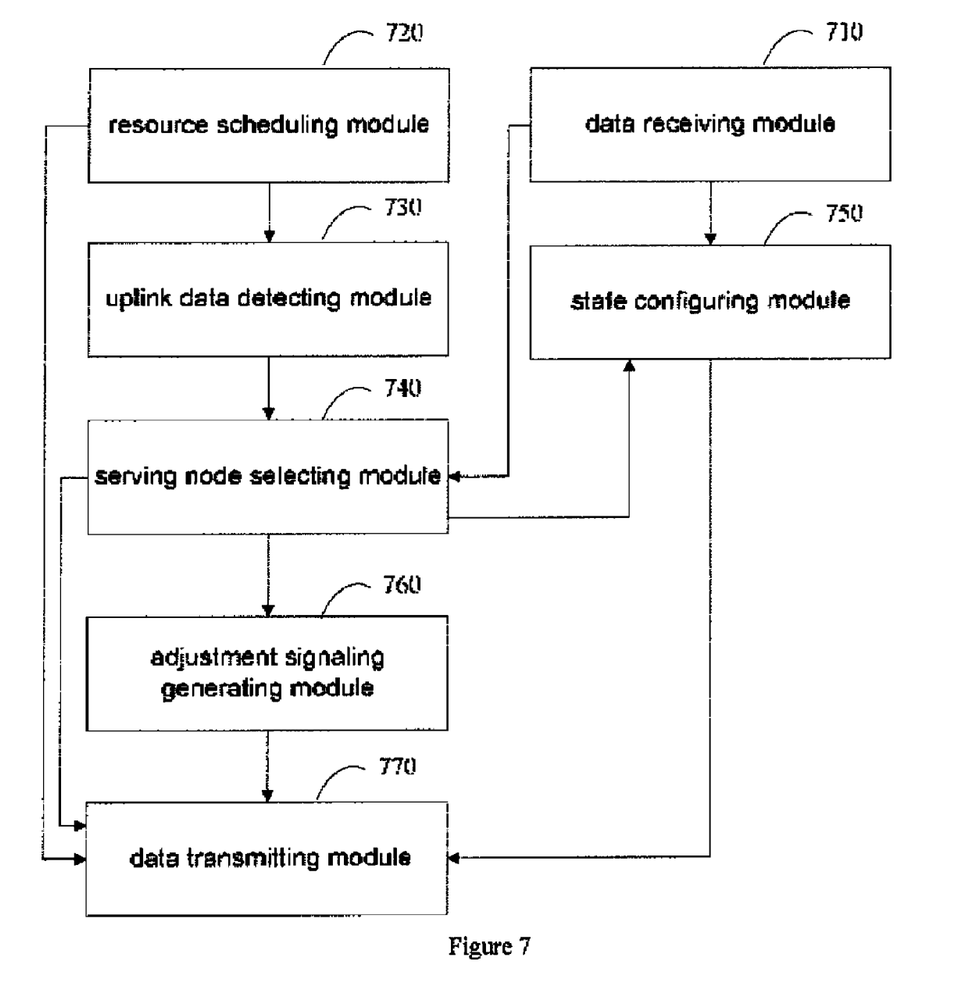
FIG. 7 is a schematic view of the structure of the base station for realizing cell handover according to the present invention.

FIG. 7 is a schematic view of the structure of the base station for realizing cell handover. As shown in FIG. 7, the base station comprises a data receiving module 710, a resource scheduling module 720, an uplink data detecting module 730, a serving node selecting module 740, a state configuring module 750, an adjustment signaling generating module 760, and a data transmitting module 770, wherein, the data receiving module 710 is used for transmitting receiving and transmitting state information to the state configuring module 750 after receiving the same information transmitted from the original serving node of the UT; and transmitting the detection information of the uplink signal to the serving node selecting module 740 after receiving the same from a dominated RS.

The resource scheduling module 720 is used for scheduling common frequency band resources for the UT or assigning a dedicated preamble and access resources to the UT when the network measurement is triggered, and transmitting the above resource scheduling information to the uplink data detecting module 730 and the data transmitting module 770.

The uplink data detecting module 730 is used for detecting the relevant data of the UT on the frequency band assigned to the UT after receiving the resource scheduling information, and transmitting the result of the detection to the serving node selecting module 740. Wherein, the relevant data is the uplink data that the UT needs to transmit, or the dedicated preamble.

The serving node selecting module 740 is used for determining a target node serving the UT after receiving the said detection information of the uplink signal and the result of the detection, generating a connection release signaling when the determined target node is different from the original serving node, and transmitting the signaling to the data transmitting module 770, and transmitting the information of the determined target node to the adjustment signaling generating module 760 and the state configuring module 750.

The state configuring module 750 is used for, according to the receiving and transmitting state information of the UT transmitted from the original serving node and the information of the target node received, configuring the BS as the serving node of the UT according to the receiving and transmitting state information when the target node is the BS per se; and generating a state configuration signaling and transmitting it to the data transmitting module 770 when the target node is the RS.

The adjustment signaling generating module 760 is used for generating an adjustment signal according to the information of the target node and the result of detecting the uplink data of the UT by the target node, and transmitting the signaling to the data transmitting module 770.

The data transmitting module 770 is used for transmitting the resource scheduling information to the UT and the corresponding RS after receiving it; and transmitting the state configuration signaling to the target node after receiving it; and transmitting the adjustment signaling to the UT after receiving it.

Wherein, the relay station in FIG. 6 and the BS in FIG. 7 can constitute a system.

Known from FIG. 4 to FIG. 7, the measurement method in cell handover procedure, the relay station and the base station provided by the present invention can be used in the scenes such as handover between a base station of a cell and the relay stations dominated by the base station, or between two relay stations dominated by a base station.

The above description is just the preferable embodiments of the present invention and is not intended to limit the protection scope of the present invention.

What is claimed is:

1. A measurement method in a cell handover procedure, wherein comprising:
   A. after network measurement is triggered, a base station scheduling resources, which are needed for transmitting uplink data, for a user terminal; and
   B. the base station and relay stations measuring the relevant data transmitted from the user terminal on the resources scheduled by the base station, and the relay stations reporting the detection information of the uplink signal derived from the measurement to the base station; and
   C. the base station determining a target node to which the user terminal will handover according to the measurement result measured by itself and/or the detection information of the uplink signal.

2. The measurement method according to claim 1, wherein after the network measurement is triggered, when the base station detects that the user terminal has uplink data, the resources scheduled by the base station being common frequency band resources, and the relevant data being the uplink data transmitted from the user terminal.

3. The measurement method according to claim 2, wherein when the base station has scheduled the common frequency band resources for the user terminal, what is between step A and step B further comprising:
   A1. the base station transmitting the resource scheduling information for scheduling the resources to corresponding relay stations and the user terminal, wherein the corresponding relay stations comprise the original serving node of the user terminal and adjacent relay stations, and the corresponding relay stations are transparent or non-transparent relay stations.

4. The measurement method according to claim 2, wherein step A further comprising:
   the base station assigning a dedicated random access preamble and access resources to the user terminal, and transmitting the above resource scheduling information to the user terminal.

5. The measurement method according to claim 4, wherein what is between step A and step B further comprising:
   A2. the base station transmitting resource scheduling information for scheduling the resources to corresponding relay stations, wherein the corresponding relay stations comprise the original serving node of the user terminal and adjacent relay stations, and the corresponding relay stations are transparent or non-transparent relay stations.

6. The measurement method according to claim 1, wherein after the network measurement is triggered, when the base station has detected that the user terminal does not have uplink data, the resources scheduled by the base station being a dedicated preamble and access resources, and correspondingly, the relevant data being the dedicated preamble transmitted from the user terminal, and step A further comprising that the base station transmitting to the user terminal the resource scheduling information obtained by scheduling.

7. The measurement method according to claim 1, wherein subsequence to step C, comprising:

D. when the target node is the original serving node of the user terminal, the handover procedure finishing; when the target node is different from the original serving node of the user terminal, the base station notifying the original serving node to release connection, and the original serving node reporting the receiving and transmitting state information of the uplink and downlink data of the user terminal.

8. The measurement method according to claim 7, wherein:

when the target node is the base station per se, the base station configuring itself according to the received state information and transmitting an adjustment signaling to the user terminal, the user terminal adjusting relevant parameters according to the adjustment information in the adjustment signaling, and then the handover procedure finishing.

9. The measurement method according to claim 7, wherein:

when the target node is a relay station, the base station generating a state configuration signaling according to the received state information and target node information and transmitting it to the target node to configure the target node, and generating an adjustment signaling and transmitting it to the user terminal, and the user terminal adjusting relevant parameters according to the adjustment information in the adjustment signaling, and then the handover procedure finishing.

10. A relay station for realizing cell handover, wherein the relay station comprising a data receiving module, an uplink data detecting module and a data transmitting module, wherein, the data receiving module being used for transmitting resource scheduling information to the uplink data detecting module after receiving the same information transmitted from a base station;

the uplink data detecting module being used for detecting relevant data of a user terminal on corresponding frequency bands after receiving the resource scheduling information, and transmitting the obtained detection information of the uplink signal to the data transmitting module;

the data transmitting module being used for transmitting the detection information to the base station after receiving the detection information of the uplink signal; and the base station and relay station measuring the relevant data transmitted from the user terminal on the resources scheduled by the base station, and the relay station reporting the detection information of the uplink signal derived from the measurement to the base station, wherein the relay station is a transparent or a non-transparent relay station, wherein the relevant data is the uplink data transmitted from the user terminal or a dedicated preamble, and wherein the data receiving module being further used for transmitting a signal to a state information generating module after receiving a connection release signaling transmitted from the base station;

correspondingly, the relay station further comprising:

the state information generating module being used for releasing the connection with the user terminal after receiving the signal transmitted from the data receiving module, and generating receiving and transmitting state information, and then transmit it to the data transmitting module; and correspondingly, the data transmitting module being further used for transmitting the receiving and transmitting state information received to the base station.

11. The relay station according to claim 10, wherein
the data receiving module being further used for transmitting the state configuration signaling to the state configuring module after receiving the state configuration signaling transmitted from the base station;

correspondingly, the relay station further comprising:

the state configuring module being used for, after receiving the configuration signaling, configuring the relay station, which the state configuring module belongs to, as the serving node of the user terminal according to the receiving and transmitting state information of the uplink and downlink data of the user terminal in the configuration signaling.

12. A base station for realizing cell handover, wherein the base station comprising a data receiving module, a resource scheduling module, an uplink data detecting module, a serving node selecting module and a data transmitting module, wherein, the data receiving module being used for transmitting the received detection information of the uplink signal transmitted from a dominated relay station to the serving node selecting module;

the resource scheduling module being used for judging whether the user terminal has uplink data when the network measurement is triggered, and correspondingly scheduling common frequency band resources for the user terminal or assigning a dedicated preamble and access resources to the user terminal, and transmitting the above resource scheduling information to the uplink data detecting module and the data transmitting module;

the uplink data detecting module being used for detecting the relevant data transmitted from the user terminal on the corresponding frequency band after receiving the resource scheduling information, and transmitting the result of the detection to the serving node selecting module;

the serving node selecting module being used for determining a target node serving the user terminal according to the received result of the detection and the detection information of the uplink signal, and transmitting the information of the target node; and the data transmitting module being used for transmitting the received resource scheduling information to the user terminal and corresponding relay stations.

13. The base station according to claim 12, wherein
the data receiving module being further used for transmitting the receiving and transmitting state information received from the original serving node of the user terminal to a configuration signaling generating module;

the serving node selecting module being further used for generating a connection release signaling and transmitting it to the data transmitting module when the determined target node is different from the original serving node of the user terminal; and being further used for transmitting the information of the target node to an adjustment signaling generating module and a state configuring module;

correspondingly, the base station further comprising:
the state configuring module being used for, after receiving the receiving and transmitting state information, according to the received information of the target node, configuring the base station as the serving node of the user terminal when the target node is the base station per se; and generating a state configuration signaling and transmitting it to the data transmitting module when the target node is a relay station; and
an adjustment signaling generating module being used for generating an adjustment signaling according to the information of the target node and the result of detecting the uplink data from the user terminal by the target node, and transmitting the adjustment signaling to the data transmitting module; and
correspondingly, the data transmitting module being further used for transmitting the received state configuration signaling to the target node; and being further used for transmitting the received adjustment signaling to the user terminal.

14. The base station according to claim 12, wherein the relevant data is uplink data transmitted from the user terminal or a dedicated preamble.

\* \* \* \* \*